Feb. 6, 1968 R. L. KEYT ET AL 3,367,821
METHOD OF APPLYING A FIBER REINFORCED RESIN LAYER TO EACH
SIDE OF A TEMPORARILY ASSEMBLED PAIR OF PANELS
Filed Oct. 19, 1964
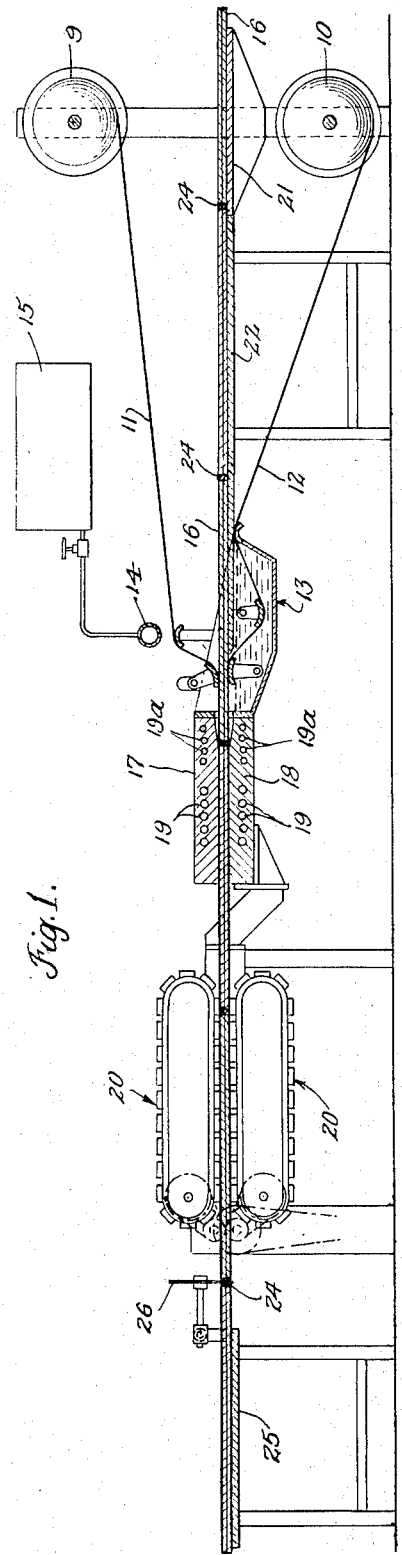
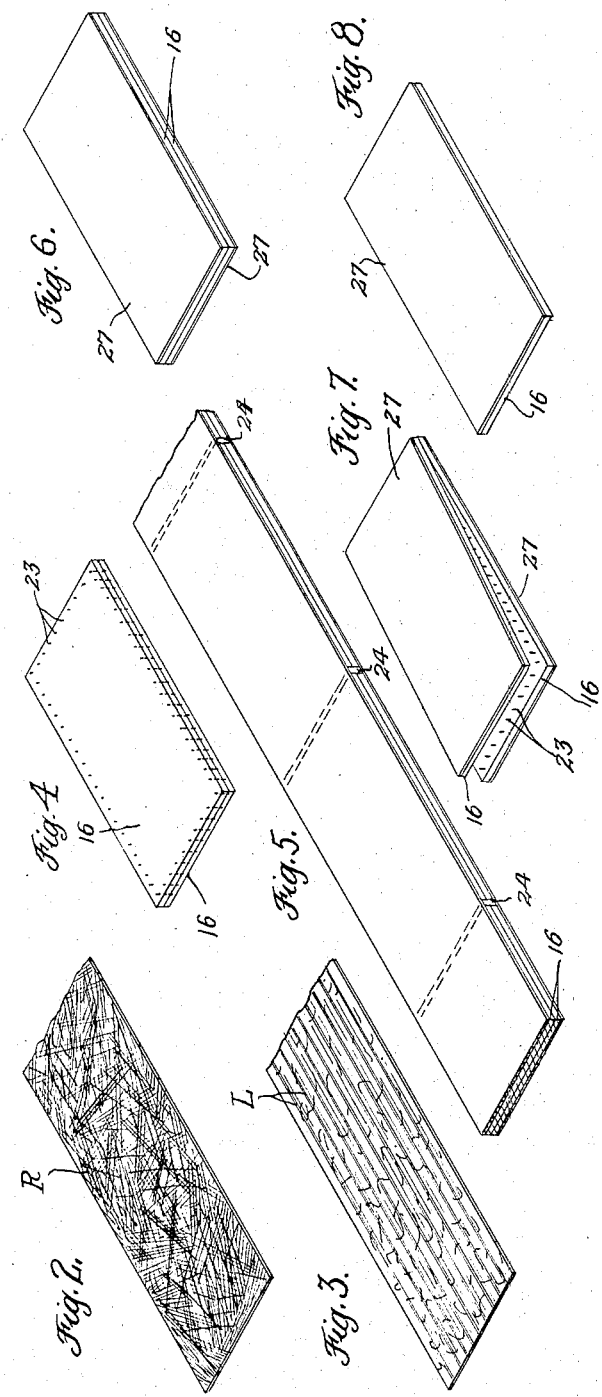
INVENTOR.
Robert L. Keyt
Charles L. McFeer
BY
Symmes, Wedt & Leshner
ATTORNEYS

United States Patent Office 3,367,821
Patented Feb. 6, 1968

3,367,821
METHOD OF APPLYING A FIBER REINFORCED RESIN LAYER TO EACH SIDE OF A TEMPORARILY ASSEMBLED PAIR OF PANELS
Robert L. Keyt, Bristol, Va., and Charles L. Meteer, Bristol, Tenn., assignors to Universal Moulded Fiber Glass Corporation, Bristol, Va., a corporation of Delaware
Filed Oct. 19, 1964, Ser. No. 404,669
5 Claims. (Cl. 156—250)

ABSTRACT OF THE DISCLOSURE

Pairs of individual panels are temporarily assembled in face to face relation and advanced toward a station where strips of fibrous reinforcement, impregnated with a heat hardenable resin, are applied to opposite outside surfaces of the panels. Heat and pressure are applied to cure the resin and bond the reinforcements to the panels. Cutting of the structure and separating the overlying panels into individual panels is carried out thereafter.

---

This invention relates to panels having a coating of fiber reinforced resin material on at least one face or surface thereof, the invention being especially concerned with the type of panel adapted for use in building construction, for instance in the position of a wall or ceiling.

Although the invention is applicable in the case of panels made of a variety of materials, the invention is particularly useful in connection with the common or well known plywood panels which are customarily supplied in the 4' by 8' size, such panels being of varying thickness commonly ranging from about ¼ of an inch to about 1 inch.

As is well known, plywood panels of the type referred to constitute an excellent building material from the structural standpoint. Moreover where a wood or wood grained surface is desired, such plywood panels are effective building components, provided at least one surface of the plywood is of high quality.

Notwithstanding certain of these desirable characteristics of the well known and widely used plywood panels, for many purposes the plywood is not suitable or requires painting or coating in order to give a desired surface appearance or in order to provide good weathering characterstics either from the standpoint of deterioration by moisture or from the standpoint of deterioration by exposure to light, or both.

The principal object of the invention is to provide a method for conveniently and efficiently producing constructional panels carrying a coating of fiber reinforced resin material, such panels having not only the desired constructional characteristics which are already well known but which further have surface characteristics including a high degree of resistance to weathering and an attractive appearance, including coloring as desired, so that the panels may readily be employed both exteriorly as well as interiorly of buildings without even the necessity of applying a coating of paint.

In acordance with the invention, plywood panels even of relatively low grade may readily be treated in accordance with the present invention to apply the fiber reinforced resin coating, and thereby enable the use of what heretofore would be considered a low grade of plywood in positions previously requiring expensive grades.

How the foregoing objects and advantages are attained will appear more fully from the following description referring to the acompanying drawings illustrating a prefered embodiment of the method acording to the invention, and in which:

FIG. 1 is a somewhat diagrammatic side elevational view of equipment arranged to carry out the method of the present invention;

FIGURE 2 is an isometric view of one face of a fibrous reinforcement element or strip preferably employed in the practice of the invention;

FIG. 3 is a view similar to FIGURE 2 but illustrating the opposite face of the fibrous strip shown in FIGURE 2;

FIGURE 4 illustrates a pair of plywood panels temporarily assembled in face to face relation in accordance with the prefered technique of the invention;

FIGURE 5 illustrates a series of panel sandwiches such as shown in FIGURE 4 assembled with fibrous reinforcement strips at both sides, as is prefered in the coating operation according to the invention;

FIGURE 6 illustrates a pair of assembled and coated panels prepared in accordance with the invention;

FIGURE 7 illustrates the separation of the panels of a pair such as shown in FIGURE 6; and FIGURE 8 illustrates a single completed panel.

Referring first to FIGURE 1, it will be seen that upper and lower rolls 9 and 10 of fibrous reinforcement strips serve as a source of supply for the strips 11 and 12, the lower of which is fed over suitable guides through a path or reservoir of liquid resin material as indicated at 13, in order to thoroughly impregnate the strip 12 with the resin. The upper strip 11 is fed over guides past a resin supply or distributing header 14 supplied from a liquid resin tank 15, the header 14 having a multiplicity of resin distributing holes so as to effect thorough impregnation of the strip 11 with the liquid resin material.

The resin material here employed is advantageously of the well known lamianting type of resin, for instance polyester resins, which are liquid but thermosetting or heat hardenable.

The two impregnated strips 11 and 12 are desirably brought together or assembled with pairs of panels to be coated, such as the panels indicated at 16, and the assembly of the strips 11 and 12 and the pairs of panels are fed through a curing and forming device comprising upper and lower die parts 17 and 18 in which the resin material is heated, for instance by electrical heater elements positioned within cavities 19. Upon emergence from the discharge end of the forming passage between the die parts 17 and 18 the completed construction is engaged by the crawler treads 20 of the puller mechanism which serves to draw the materials into and through the forming device.

The principal portion of the forming passage between the die parts 17 and 18, especially in the region of the heater elements 19, is of substantially uniform cross section conforming with the width and thickness of the assembled sandwich panels, so that the surfaces of the panels in contact with the die parts 17 and 18 are actually smoothed and formed by the die parts.

The entrance end of the forming passage is desirably flared to an enlarged inlet opening and the quantity of liquid resin material picked up by the strips 11 and 12 is in excess of that required to fill the portion of the passage of uniform cross section. The tapered inlet end thereby serves to expel the excess resin and this flows back into the resin pan 13, space being provided at the opposite side edges of the panels 16–16 to permit such return flow of the resin not only from the upper surface or strip 11 but also from the lower surface or strip 12. Cavities 19a provided in the entrance end portion of the die parts 17 and 18 serve for circulation of a cooling medium in the entrance end of the die and thereby avoid undesired setting or curing of the resin in the entrance end of the forming passage.

Table structures 21 and 22 are arranged between the upper and lower strips 11 and 12 being fed from the rolls 9 and 10 in order to provide for the feed of the panel sandwiches into the equipment. Preliminarily, pairs of panels 16 are interconnected in face to face relation for instance by means of a series of headless nails or staples near the edges of the panels, as indicated at 23 in FIGURE 4, and the panel sandwiches thus formed are brought to the table 21 and then assembled with spacer strips 24 between the ends of adjacent panel sandwiches, the assembly of these parts being fed between the impregnated strips 11 and 12 and thence into the forming passage. Beyond the puller mechanism, the continuous completed sandwich produced is received on a table 25 and a saw or cutting tool 26 is arranged for transverse motion in order to sever the panel sandwiches from each other in the region of the spacer strips 24. The spacer strips thus provide a zone for the transverse cut, without impairing the dimensional integrity of the panels originally fed into the equipment. Any remaining parts of the spacer strips 24 and of the reinforcement strips 11 and 12 which protrude from the ends of the panels may of course be trimmed off in any convenient manner as by a grinding operation, and such an operation may also be applied if desired to the side edges of the panels, in the event that resin flash creeps around the edges of the panels from the edges of the impregnated strips 11 and 12.

A pair of interconnected and coated panels produced in this way is illustrated in FIGURE 6, each panel 16 of the pair having a surface coating 27 on the outer side of the panel. Such panel sandwiches may conveniently be shipped to points of use while still assembled, thereby reducing the number of pieces required to be handled in shipment, or alternatively, the panels may be separated. Such separation, regardless of when it occurs, is illustrated in FIGURE 7, which indicates the manner in which one of the panels may be separated from the other, thereby exposing the headless nails 23, which may of course be removed if desired, or if the panel is employed in a position where the back face is not exposed and not likely to damage other structure, the nails may merely be ignored and the panel applied to the desired wall or ceiling and fastened in place.

In accordance with the preferred practice of the invention, the fibrous reinforcement strips 11 and 12 desirably comprise glass fiber strips, for instance mat type of glass fibrous strips.

When employing glass fiber reinforcement strips, it is desirable in order to produce a pleasing surface appearance that the fibers of the reinforcement strip adjacent to the exposed surface be randomly distributed in the strips. Glass fiber mats having such random distribution of the glass fibers are readily available. However, because of the technique as described above for applying the fiber reinforced coatings to the panels, and especially because of the preferred employment of the puller mechanism to draw the materials through the forming passage, if the reinforcement strips be formed entirely of random fibers, the tensile strength of the strips would not be adequate to withstand the pulling forces and breakage of the strips would occur between adjacent ends of the panels. In accordance with the invention it is therefore preferred to employ reinforcement strips incorporating not only the randomly distributed fibers at the exposed surface but also incorporating longitudinally oriented fibers, for instance in the form of multi-fiber rovings extended lengthwise of the reinforcement strips 11 and 12. A glass fiber mat of this composite type of structure is also available, the two faces of such a mat being illustrated in FIGURES 2 and 3, in which the side of the mat on which the random fibers predominate being indicated at R, in FIGURE 2, and the side of the mat in which the longitudinal fibers or rovings occur being indicated at L in FIGURE 3. In accordance with the preferred practice of the invention, a mat of the kind illustrated in FIGURES 2 and 3 is used for each one of the reinforcement strips 11 and 12 and in each case, the surface R of the mat is positioned away from the panel and the surface L adjacent to the panel. In this way longitudinal fibers are present in the reinforcement strips in order to bridge the regions between the adjacent but spaced ends of the panels being fed through the equipment, thereby retaining the spacers 24 in proper position and also providing adequate longitudinal strength in the regions between adjacent ends of the panels to withstand the pulling force imparted by the puller mechanism 20.

Various features of the invention are applicable to the coating of one or both sides of panels of a wide variety of types. For example, single (instead of paired) panels of various types may be fed through the equipment in edge-to-edge relation with the impregnated reinforcement or fibrous sheets at one or both sides thereof, and the coated and interconnected panels may thus be severed at intervals to form pieces of any desired length for instance 40 feet. For this purpose the panels, for example 4'x8' plywood or Celotex panels may be fed edge-to-edge either in end-to-end relation or crosswise, and for this purpose the spacer strips between the panels may be omitted. With excess liquid resin initially picked up by the reinforcement or fibrous sheets, the resin will flow into the cracks at the adjoining edges of the panels and when this resin is cured or solidified it will form a strong bond between the adjoining edges of the panels, thereby consolidating the several panels into a sturdy piece even though incorporating a large number of individual panels.

I claim:

1. A method for applying a fiber reinforced resin layer to one side of panels comprising temporarily fastening pairs of such panels to each other in face to face relation, impregnating with a heat hardenable liquid resin a pair of continuous fibrous reinforcement strips, positioning the pair of impregnated strips at the outer faces of the panels of a series of such pairs to form a series of panel sandwiches interconnected by the reinforcement strips, feeding the interconnected series of sandwiches through a heated forming passage to harden the resin, and advancing the panels and reinforcement through the forming passage by pulling on the interconnected series of sandwiches beyond the delivery end of the forming passage, thereby producing a series of pairs of panels temporarily fastened together, each panel having a layer of fiber reinforced resin at one side thereof.

2. A method according to claim 1 in which the reinforcement strips comprise fibrous strips incorporating fibers oriented in the direction of feed through the forming passage and bridging the regions between adjacent panel sandwiches fed through the forming passage.

3. A method according to claim 2 in which the reinforcement strips further include fibers of random orientation, the random fibers of each reinforcement strip being positioned at the outer face of the strip as applied to the panel.

4. A method according to claim 1 in which spacers are positioned between the adjacent edges of the panels and are fed with the panels through the forming passage.

5. A method according to claim 4 in which the severing of the panels from each other is effected by cutting through the spacers.

References Cited
UNITED STATES PATENTS 2,991,214    7/1961    Burkholder _____ 156—301
3,049,456    8/1962    Goldstone _____ 156—301 X EARL M. BERGERT, *Primary Examiner.*

HAROLD ANSHER, *Examiner.*